United States Patent [19]

Ohmori

[11] Patent Number: 5,043,968

[45] Date of Patent: Aug. 27, 1991

[54] APPARATUS FOR CLEANING THE PICK UP LENS OF A COMPACT DISC PLAYER

[75] Inventor: Shigeyuki Ohmori, Gotemba, Japan

[73] Assignee: Showa Electric Co., Ltd., Taipei, Taiwan

[21] Appl. No.: 513,968

[22] Filed: Apr. 24, 1990

[51] Int. Cl.⁵ .............................................. G11B 3/58
[52] U.S. Cl. ........................................ 369/71; 369/72; 369/292
[58] Field of Search ............. 369/71, 72; 15/DIG. 12, 15/97.1; 360/128

[56] References Cited

U.S. PATENT DOCUMENTS

| | | | |
|---|---|---|---|
| 4,556,433 | 12/1985 | Clausen | 369/72 |
| 4,628,388 | 12/1986 | Kawabe | 360/128 |
| 4,817,078 | 3/1989 | Iwata | 15/DIG. 12 |
| 4,870,636 | 9/1984 | Yamamoto | 15/DIG. 12 |

FOREIGN PATENT DOCUMENTS

| | | | |
|---|---|---|---|
| 0214238 | 9/1986 | Japan | 364/72 |
| 0136371 | 6/1988 | Japan | 369/72 |
| 0146177 | 6/1989 | Japan | 369/72 |

*Primary Examiner*—Stuart S. Levy
*Assistant Examiner*—Tan Nguyen
*Attorney, Agent, or Firm*—Bacon & Thomas

[57] ABSTRACT

The present invention provides an apparatus for cleaning a signal pick up lens in a compact disc (CD) player, which has a size similar to the compact disc for the compact disc player and can be put on a compact disc tray of the CD player and pushed into the CD player to clean the signal pick up lens therein. The cleaning apparatus comprises a cleaner disc having a size similar to a conventional compact disc; a fly wheel disc which is rotatably fitted with the cleaner disc and has its axis align with the center of the signal pick up lens; a connection part which is located at one of both horizontal faces on said fly wheel disc for connecting with an outside starter to allow said fly wheel disc to obtain an initial turning speed and rotate through a period of time incessantly due to the inertia; and a cleaning member which is located at the other horizontal face of said fly wheel disc and provided with a cleaning piece made of fabrics or nonwoven material for touching and cleaning said signal pick up lens while said fly wheel disc is turning.

5 Claims, 4 Drawing Sheets

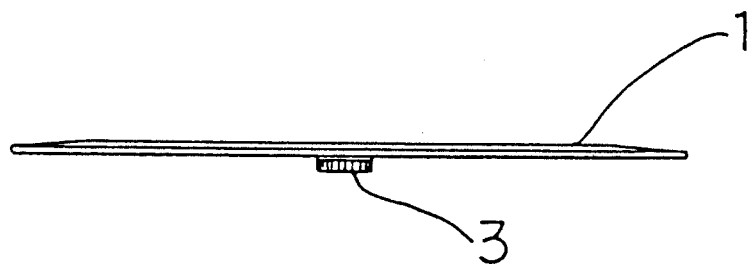
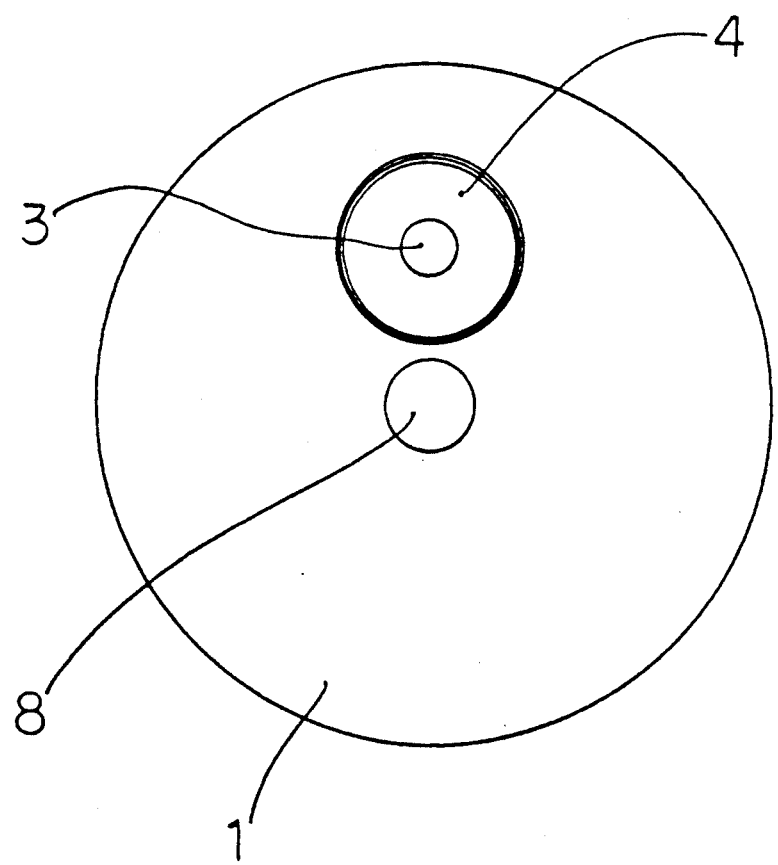

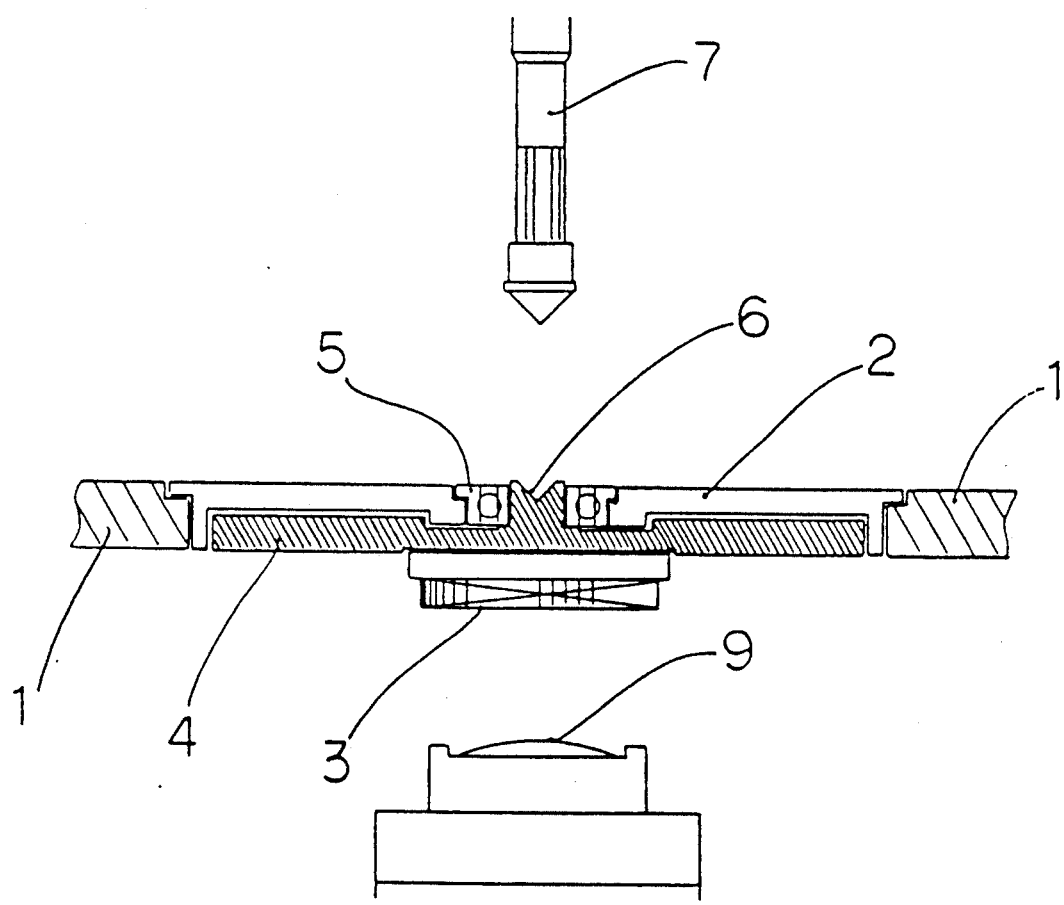

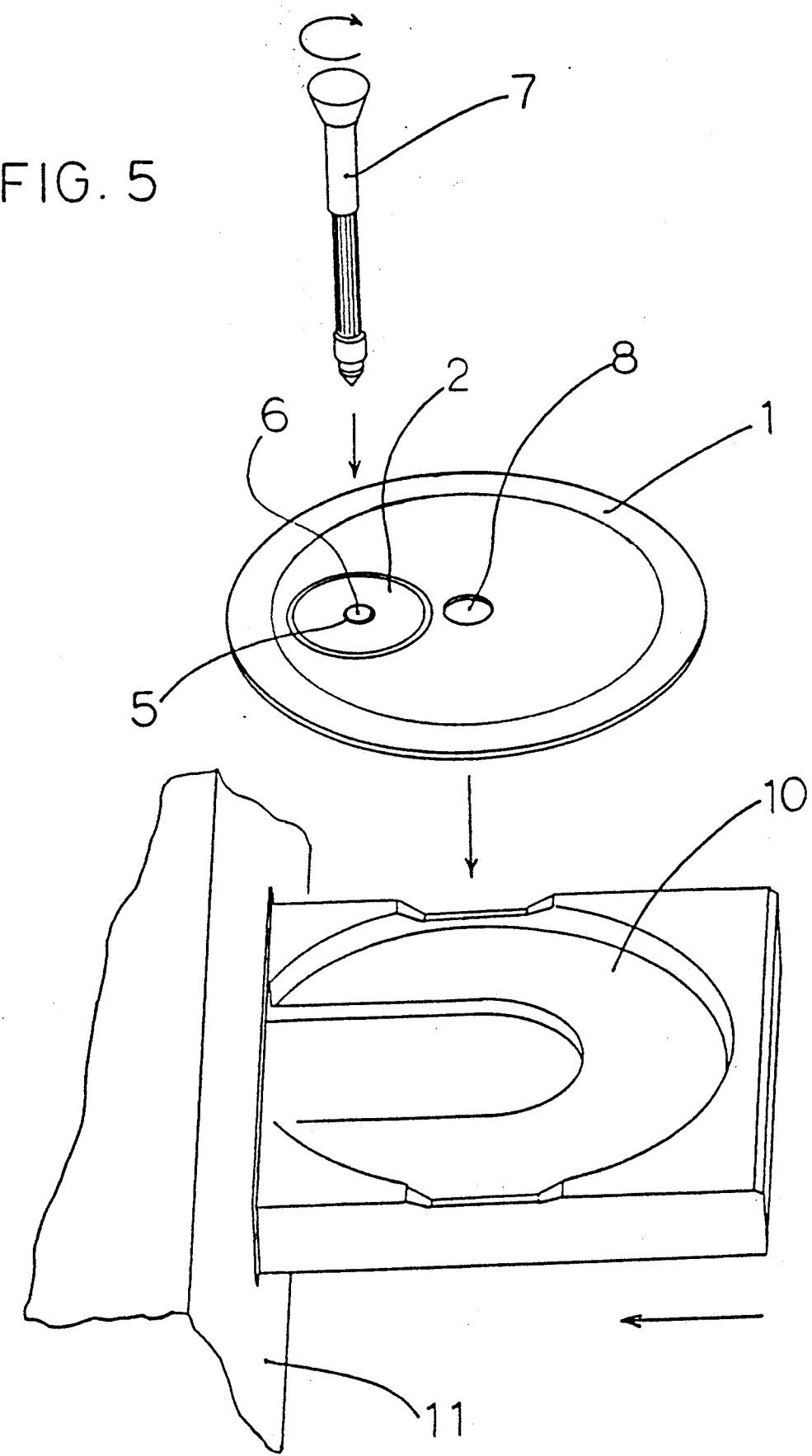

APPARATUS FOR CLEANING THE PICK UP LENS OF A COMPACT DISC PLAYER

TECHNICAL FIELD OF THE INVENTION

The invention is related to an apparatus for cleaning the signal pick up lens in a compact disc player.

BACKGROUND OF THE INVENTION

Usually, a compact disc player is a machine which is applied to read digital signals recorded in a compact disc and to transform these signals into audio or video signals by means of an optical signal pick up lens. If the signal pick up lens gets dirty, its reading function may deteriorate and subsequently the audio or video signals transformed may become defective.

Unfortunately, the signal pick up lens is located inside the compact disc player so that it is inconvenient for the operator to clean dirt from the lens.

SUMMARY OF THE INVENTION

The present invention provides an apparatus for cleaning a signal pick up lens in a compact disc (CD) player, which has a size similar to the compact disc for the compact disc player and can be put on the compact disc tray to clean said signal pick up lens inside the CD player.

The cleaning apparatus according to the invention comprises a cleaner disc having a size similar to a conventional compact disc;

a fly wheel disc which is rotatably fitted with said cleaner disc and has its axis align with the center of said signal pick up lens;

a connection part which is located at one of both horizontal faces on said fly wheel disc for connecting with an outside starter to allow said fly wheel disc to obtain an initial turning speed and continue to for a period of time due to inertia; and a cleaning member which is located at the other horizontal face of said fly wheel disc and provided with a cleaning member made of fabric or nonwoven material for touching and cleaning said signal pick up lens while said fly wheel disc is turning.

The steps for operating said cleaning apparatus include putting said cleaning apparatus on the compact disc tray of the compact disc player, actuating the outside starter manually, electrically, or mechanically and connecting with the connection part to allow said fly wheel disc to obtain an initial turning speed, and immediately pushing said compact disc tray inside said compact disc player, wherein said fly wheel disc will continue to rotate for a period of time due to inertia, and the cleaning member on said turning fly wheel disc will be in contact with the surface of the signal pick up lens to perform the cleaning job.

The apparatus for cleaning a pick up lens in a compact disc player according to the invention has two advantages: 1) the cleaning member aligns with the axial center of the signal pick up lens and cleans the surface of the pick up lens with a rotating movement so that an excellent cleaning function can be obtained; and 2) the cleaning member is driven to rotate by an outside starter so that it is simple and convenient for user to operate.

BRIEF DESCRIPTION OF THE DRAWINGS

Other features and functions of the apparatus for cleaning a signal pick up lens in a compact disc player according to the invention will be further explained in the following detailed description of a preferred embodiment thereof and taken in conjunction with the accompanying the drawings, in which:

FIG. 2 is a side view of FIG. 1;

FIG. 3 is a bottom view of FIG. 1;

FIG. 4 is a sectional view of the cleaning member of FIG. 1, showing the turning mechanism; and FIG. 5 is a perspective view of FIG. 1, showing the operation of the cleaning apparatus.

DETAILED DESCRIPTION OF THE PREFERRED EMBODIMENT

Figure 1:
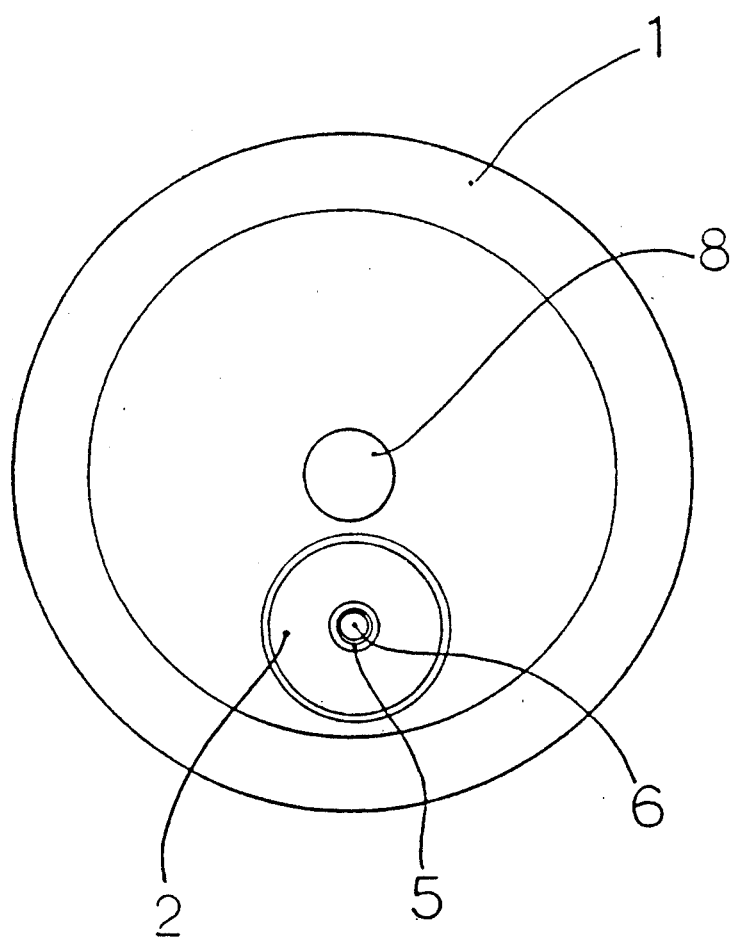
FIG. 1 is a top view of a preferred embodiment of the apparatus for cleaning a signal pick up lens in a compact disc player according to the invention.

Referring to FIGS. 1, 2, 3 and 4, a preferred embodiment of the apparatus for cleaning a signal pick up lens in a compact disc (CD) player according to the present invention is shown, which comprises cleaner disc 1 having a dimensions very close to those of a conventional CD; and a fly wheel disc 4 which is rotatably mounted on the cleaner disc 1 at a specific location that is offset from the central hole 8 of the cleaner disc 1 by a bracket 2 having a central bearing 5. A cleaning member 3 is concentrically attached onto the bottom surface of the fly wheel disc 4, the cleaning member 3 is provided with a cleaning piece made of fabric or nonwoven material at its bottom surface. A connection part 6 is provided at the center of the top surface of the fly wheel disc 4, in which the connection part 6 is fixedly connected to the bearing 5 for rotation, and with its end protruding from the inner hole of the bearing 5. The protruding end of the connection part 6 is engageable by an outside starter 7 for imparting a turning force. As long as said fly wheel disc 4 with said cleaning member 3 secured thereto is actuated by said starter 7, there is an initial turning speed obtained through the function of said bearing 5. Furthermore, said fly wheel disc 4 will continue to rotate for a period of time due to the inertia so that said cleaning member 3 is able to clean the signal pick up lens 9 inside the CD player.

As shown in FIG. 5, said cleaner disc 1 can be put on the compact disc tray 10 in the compact disc player 11, and the fly wheel disc 4 can acquire an initial rotation by engaging starter 7 and driving same manually, electrically, or mechanically with the connection part 6. Then, said compact disc tray 10 is pushed into said compact disc player 11. Due to the inertia of said fly wheel disc 4, said cleaning member 3 will keep rotating in-situ to clean said signal pick up lens for a period of time.

It is noted that the above descripted embodiment is only an example for the invention and any change and modification is possible without departing from the spirit of the or scope of the claims invention.

What is claimed is:

1. An apparatus for cleaning a signal pick up lens in a compact disc player comprising:
    a) a cleaner disc having a size corresponding to that of a conventional compact disc;
    b) a bearing;
    c) a fly wheel disc rotatably mounted on the cleaner disc by the bearing and having an axis alignable with the center of the signal pick up lens, the fly wheel disc defining a pair of opposed horizontal faces;

d) a connection part provided on one horizontal face of the fly wheel disc for engagement by an outside starter for initiating rotation of the fly wheel disc and causing the fly wheel disc to continue to rotate for a period of time due to inertia; and e) a cleaning member provided on the other horizontal face of the fly wheel disc, the cleaning member including a cleaning means for engaging and cleaning the signal pick up lens during rotation of the fly wheel disc.

2. The apparatus of claim 1, wherein the cleaner disc includes a central hole, and the fly wheel disc is mounted for rotation about an axis that is offset from the central hole.

3. The apparatus of claim 2 further including a bracket secured to the cleaner disc, the bracket being provided within a central hole, and the bearing is mounted within the central hole.

4. The apparatus of claim 1 wherein the cleaning means includes a fabric.

5. The apparatus of claim 1 wherein the cleaning means includes a non-woven material.

* * * * *